(12) United States Patent
Cheng et al.

(10) Patent No.: US 11,586,085 B2
(45) Date of Patent: Feb. 21, 2023

(54) DISPLAY APPARATUS

(71) Applicant: Au Optronics Corporation, Hsinchu (TW)

(72) Inventors: Sheng-Yen Cheng, Hsinchu (TW); Min-Tse Lee, Hsinchu (TW); Hung-Chia Liao, Hsinchu (TW); Jia-Hong Wang, Hsinchu (TW); Ping-Wen Chen, Hsinchu (TW); Yueh-Hung Chung, Hsinchu (TW); Ya-Ling Hsu, Hsinchu (TW); Chen-Hsien Liao, Hsinchu (TW)

(73) Assignee: Au Optronics Corporation, Hsinchu (TW)

(*) Notice: Subject to any disclaimer, the term of this patent is extended or adjusted under 35 U.S.C. 154(b) by 286 days.

(21) Appl. No.: 16/939,072

(22) Filed: Jul. 27, 2020

(65) Prior Publication Data

US 2021/0055615 A1   Feb. 25, 2021

Related U.S. Application Data

(60) Provisional application No. 62/901,837, filed on Sep. 18, 2019, provisional application No. 62/889,181, filed on Aug. 20, 2019.

(30) Foreign Application Priority Data

Jun. 3, 2020   (TW) .................. 109118552

(51) Int. Cl.
*G02F 1/1362* (2006.01)

(52) U.S. Cl.
CPC .... *G02F 1/136286* (2013.01); *G02F 1/13629* (2021.01); *G02F 2201/121* (2013.01)

(58) Field of Classification Search
CPC .................. G02F 1/136286; G02F 2201/121
(Continued)

(56) References Cited

U.S. PATENT DOCUMENTS 9,356,051 B2   5/2016   Wu et al.
9,379,139 B2   6/2016   Jeon et al.
(Continued)

FOREIGN PATENT DOCUMENTS

CN   102403320   4/2012
CN   103578443   2/2014
(Continued)

*Primary Examiner* — Edward J Glick
*Assistant Examiner* — William D Peterson
(74) *Attorney, Agent, or Firm* — JCIPRNET

(57) ABSTRACT

A display apparatus including data lines, first gate lines, pixel structures, second gate lines, and first common lines is provided. The data lines are arranged in a first direction. The first gate lines are arranged in a second direction. The data lines and the second gate lines are arranged in the first direction, and the second gate lines are electrically connected to the first gate lines. The pixel structures are arranged in pixel columns which are arranged in the first direction. Each of the first common lines and the corresponding second gate line are configured between two adjacent pixel columns. The first common line and the corresponding second gate line are configured respectively on the opposite sides of the first gate line which is electrically connected to the corresponding second gate line. The first common line and the corresponding second gate line are structurally separated.

17 Claims, 7 Drawing Sheets

(58) Field of Classification Search
USPC .......................................................... 349/84
See application file for complete search history.

(56) References Cited

U.S. PATENT DOCUMENTS

| | | | |
|---|---|---|---|
| 9,646,559 B2 | 5/2017 | Min et al. | |
| 2014/0043306 A1* | 2/2014 | Min | G09G 3/3685 345/204 |
| 2019/0042047 A1* | 2/2019 | Liao | G09G 3/3648 |

FOREIGN PATENT DOCUMENTS

| | | |
|---|---|---|
| CN | 104575349 | 4/2015 |
| CN | 104808356 | 7/2015 |
| CN | 106504689 | 3/2017 |
| CN | 106647073 | 5/2017 |
| CN | 109387965 | 2/2019 |
| KR | 20140021776 | 2/2014 |
| KR | 20150001430 | 1/2015 |

* cited by examiner

DISPLAY APPARATUS

CROSS-REFERENCE TO RELATED APPLICATION

This application claims the priority benefits of U.S. provisional application Ser. No. 62/889,181, filed on Aug. 20, 2019, U.S. provisional application Ser. No. 62/901,837, filed on Sep. 18, 2019, and Taiwan application serial no. 109118552, filed on Jun. 3, 2020. The entirety of each of the above-mentioned patent applications is hereby incorporated by reference herein and made a part of this specification.

BACKGROUND

Technical Field

The disclosure relates to an electronic apparatus, and particularly to a display apparatus.

Description of Related Art

With the development of display technology, people demand more from display apparatus than optical characteristics, such as high resolution, high contrast, and wide viewing angle. People also expect to see elegance in the appearance of display apparatus. For example, people expect the display apparatus to have a narrow bezel, even without a bezel.

Generally speaking, a display apparatus includes pixel structures configured in a display area, a data driving circuit configured below the display area, and gate driving circuits configured on the left, right, or both sides of the display area. In order to reduce the widths of the left and right sides of the bezel of the display apparatus, both the gate driving circuit and the data driving circuit may be arranged on the lower side of the display area. When the gate driving circuit is configured on the lower side of the display area, the horizontal gate lines need to be electrically connected to the gate driving circuit through the vertical gate line. However, the gate-on pulse signal of the vertical gate lines may affect the potentials of some pixel structures, thereby causing abnormal display.

SUMMARY

The disclosure provides a display apparatus with excellent performance.

The disclosure also provides another display apparatus with excellent performance as well.

A display apparatus of the disclosure includes a first substrate, multiple data lines, multiple first gate lines, multiple pixel structures, multiple second gate lines, multiple first common lines, a second substrate, and a display medium. The data lines are configured on the first substrate, and are arranged in a first direction. The first gate lines are configured on the first substrate, and are configured in a second direction, in which the first direction crisscrosses the second direction. The pixel structures are configured on the first substrate, and are electrically connected to the scan lines and the data lines. The second gate lines are configured on the first substrate, in which the data lines and the second gate lines are arranged in the first direction, and the second gate lines are electrically connected to the first gate lines. The first common lines are configured on the first substrate, in which the pixel structures are arranged in pixel columns, and the pixel columns are arranged in the first direction. Each of the first common lines and the corresponding second gate line are configured between two adjacent pixel columns of the pixel columns. The first common line and the corresponding second gate line are respectively configured on the opposite sides of the first gate line which is electrically connected to the second gate line. And the first common line and the corresponding second gate line are structurally separated. The second substrate is configured to be opposite to the first substrate. The display medium is configured between the first substrate and the second substrate.

Another display apparatus of the disclosure includes a first substrate, multiple data lines, multiple first gate lines, multiple pixel structures, multiple second gate lines, a second substrate, and a display medium. The data lines are configured on the first substrate, and are arranged in a first direction. The first gate lines are configured on the first substrate, and are arranged in a second direction, in which the first direction crisscrosses the second direction. The pixel structures are configured on the first substrate, electrically connected to the data lines and the first gate lines, and arranged in x number of pixel columns and y number of pixel rows. The x number of pixel columns are arranged in the first direction, the y number of pixel rows are arranged in the second direction, x and y are positive integers greater than 2, and the pixel structure has a first width a1 and a second width a2 respectively in the first direction and the second direction. The second gate lines are configured on the first substrate, in which the data lines and the second gate lines are arranged in the first direction, and the second gate lines are electrically connected to the first gate lines. The second substrate is configured to be opposite to the first substrate. The display medium is configured between the first substrate and the second substrate. Each of the first gate lines is electronically connected to n number of the second gate lines. $(a1 \cdot x + a2 \cdot y) < 2000000$, and $n=2$; or $2000000 < (a1 \cdot x + a2 \cdot y) < 2400000$, and $n=3$; or $2400000 < (a1 \cdot x + a2 \cdot y) < 3000000$, and $n=4$; or $(a1 \cdot x + a2 \cdot y) > 3000000$, and $n=5$.

In an embodiment of the disclosure, a signal of the first common line as described above and a gate-off signal of the second gate line are substantially the same.

In an embodiment of the disclosure, each of the first gate lines as described above is electrically connected to the n number of the second gate lines, in which n is a positive integer. Each of the first gate lines and the n number of the second gate lines have the $1^{st}$ to $n^{th}$ connection points arranged in sequence in the first direction. The second gate lines include the $1^{st}$ to $n^{th}$ second gate line groups arranged in sequence in the first direction. The second gate lines of the $m^{th}$ second gate line group of the $1^{st}$ to $n^{th}$ second gate line groups and the correspond first gate lines have the $m^{th}$ connection point of the $1^{st}$ to $n^{th}$ connection points, in which m is a positive integer, and $n \geq m \geq 1$. The display apparatus further includes a common electrode, multiple common pad groups, multiple first transfer elements, n number of second common pads, and n number of second transfer elements. The common electrode is configured on the second substrate, and is located between the second substrate and the display medium. The common pad groups are configured on the first substrate, and are configured to correspond respectively to the $1^{st}$ to $n^{th}$ second gate line groups, in which the pixel structures have a first side and a second side opposite to each other. The common pad groups are configured on the second side of the pixel structures, and each of the common pad groups includes multiple first common pads. The first transfer elements are configured respectively on the first common pads of the common pad groups, and are electrically connected to the first common pads of the common pad groups and the common electrode. The n number of the second common pads are configured on the first substrate, and are configured to correspond respectively to the $1^{st}$ to $n^{th}$ second gate line groups, and are located on the first side of the pixel structures. The n number of the second transfer elements are configured respectively on the n number of the second common pads, and are electrically connected to the n number of the second common pads and the common electrode. A common pad group and a second common pad correspond to the same second gate line group, and the potential of the second common pad is greater than the potentials of the first common pads of the common pad group.

In an embodiment of the disclosure, the display as described above further includes a third common pad, which is configured on the first substrate and is located on the first side of pixel structures. The third common pad and the second common pads are arranged in sequence in the first direction and are structurally separated from each other. The third common pad is configured to correspond to the $1^{st}$ to $n^{th}$ second gate line groups. And the potential of the third common pad is greater than the potentials of the corresponding second common pads.

In an embodiment of the disclosure, the display apparatus as described above further includes multiple second common lines, a first peripheral line, and a second peripheral line. The second common lines are configured on the first substrate, and the second gate lines and the second common lines are arranged in the first direction, in which each of the second common lines is configured between two adjacent pixel columns of the pixel columns. The first peripheral line is configured on the first substrate and is located on the first side of the pixel structures, in which the first common lines are electrically connected to the first peripheral line. The second peripheral line is configured on the first substrate and is located on the second side of the pixel structures, in which the two ends of each of the second common lines are electrically connected respectively to the first peripheral line and the second peripheral line.

In an embodiment of the disclosure, the first gate lines as described above include an odd number of the first gate lines and an even number of the first gate lines. The odd number of the first gate lines include the $(1+2 \cdot K)^{th}$ first gate lines, in which K=0, 1, ..., p, and p is a positive integer greater than or equal to 2. The even number of the first gate lines include the $2L^{th}$ first gate lines, in which L=1, 2, ..., q, and q is a positive integer greater than or equal to 3. The second gate lines include the $1^{st}$ to $(p+1)^{th}$ second gate lines and the (p+2) to $(p+q+1)^{th}$ second gate lines arranged in sequence in the first direction. The $1^{st}$ to $(p+1)^{th}$ second gate lines are electrically connected to the $(1+2 \cdot K)^{th}$ first gate line, and the (p+2) to $(p+q+1)^{th}$ second gate lines are electrically connected to the $2L^{th}$ first gate line.

In an embodiment of the disclosure, the connection points of the $1^{st}$ to $(p+1)^{th}$ second gate lines and the $(1+2 \cdot K)^{th}$ first gate line as well as the connection points of the (p+2) to $(p+q+1)^{th}$ second gate lines and the $2L^{th}$ first gate line are generally distributed along multiple diagonal lines parallel to each other.

In an embodiment of the disclosure, the connection points of the $1^{st}$ to the $(p+1)^{th}$ second gate lines and the $(1+2 \cdot K)^{th}$ first gate line as well as the connection points of the (p+2) to $(p+q+1)^{th}$ second gate lines and the $2L^{th}$ first gate line are generally distributed in a V-shaped pattern.

In an embodiment of the disclosure, the display apparatus as described above further includes multiple first common lines configured on the first substrate. Each of the first common lines and the corresponding second gate line are configured between two adjacent pixel columns of x number of the pixel columns. The first common line and the corresponding second gate line are configured respectively on the opposite sides of the first gate line electrically connected to the second gate line. And the first common line and the corresponding second gate line are structurally separated.

DESCRIPTION OF THE EMBODIMENTS

Figure 1:
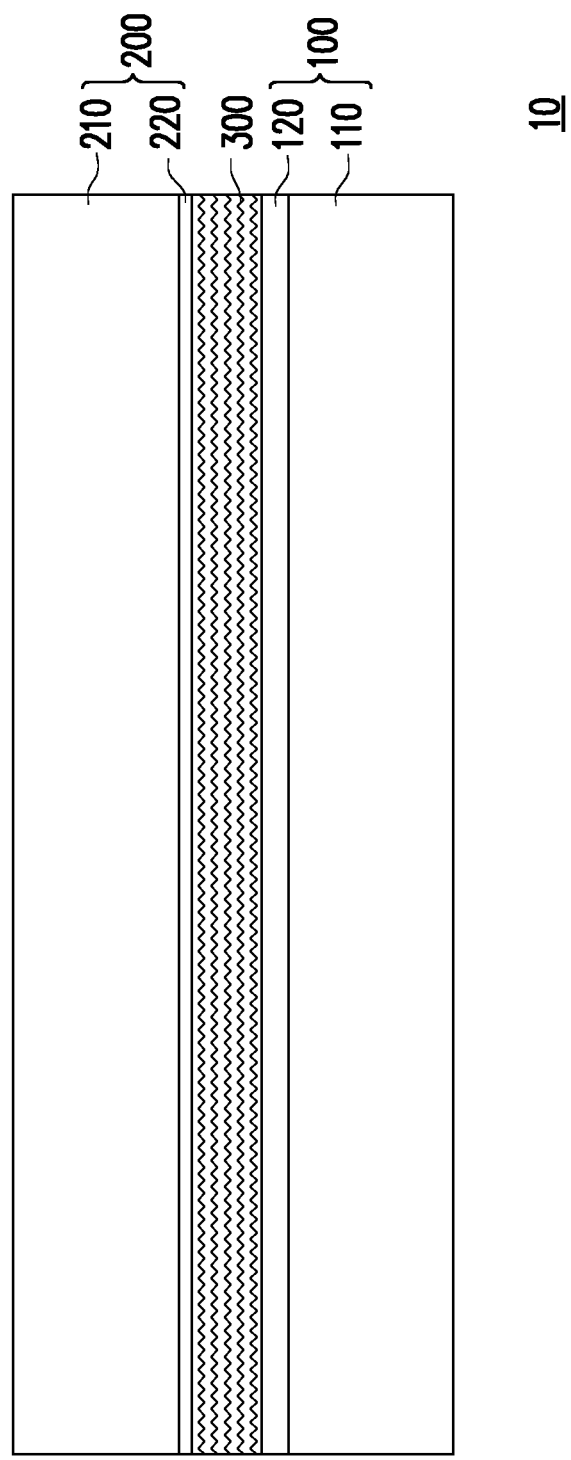
FIG. 1 is a schematic cross-sectional view of a display apparatus 10 according to an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

It should be understood that when an element, such as a layer, a film, an area, or a substrate, is indicated to be "on" another element or "connected to" another element, it may be directly on another element, connected to another element, or an element may exist in the middle. In contrast, when an element is indicated to be "directly on another element" or "directly connected to" another element, an element does not exist in the middle. For example, the term "connect(ed)" indicated in the specification may indicate a physical and/or electrical connection. Furthermore, the phrase "electrically connect(ed)" or "couple(d)" may also be used when other elements exist between two elements.

The usages of "approximately", "similar to", "essentially", or "substantially" indicated throughout the specification include the indicated value and an average value having an acceptable deviation range, which is a certain value confirmed by people skilled in the art, and is a certain amount considered the discussed measurement and measurement-related deviation (that is, the limitation of measurement system). For example, "approximately" may indicate to be within one or more standard deviations of the indicated value, such as being within ±30%, ±20%, ±10%, or ±5%. Furthermore, the usages of "approximately", "similar to", or "substantially" indicated throughout the specification may refer to a more acceptable deviation scope or standard deviation depending on optical properties, etching properties, or other properties, and all properties may not be applied with one standard deviation.

Unless otherwise defined, all terms (including technical and scientific terms) used herein have the same meaning as they are commonly understood by those of ordinary skill in the art. It should be further understood that terms such as those defined in the common dictionaries should be interpreted in the context of the relevant technology and the present disclosure with whom the meanings of the terms are consistent, and the terms should not be interpreted in an idealized or excessively formal way unless they are explicitly defined as such herein.

FIG. 1 is a schematic cross-sectional view of a display apparatus 10 according to an embodiment of the present disclosure.

As shown in FIG. 1, the display apparatus 10 includes a pixel array substrate 100, an opposite substrate 200, and a display medium 300, in which the display medium 300 is configured between the pixel array substrate 100 and the opposite substrate 200. The pixel array substrate 100 includes a first substrate 110 and an element layer 120, in which the element layer 120 is configured on the first substrate 110 and is located between the display medium 300 and the first substrate 110. The opposite substrate 200 includes a second substrate 210, in which the second substrate 210 is configured to be opposite to the first substrate 110, and the display medium 300 is located between the first substrate 110 and the second substrate 210.

In the present embodiment, a material of the first substrate 110 may be glass, quartz, organic polymer, or other applicable materials; a material of the second substrate 210 may be glass, quartz, organic polymer, or other applicable materials.

In the present embodiment, the display medium 300 may be, for example, a liquid crystal. However, the present embodiment is not limited thereto. In other embodiments, the display medium 300 may also be an organic electroluminescent layer or other applicable materials.

Figure 2:
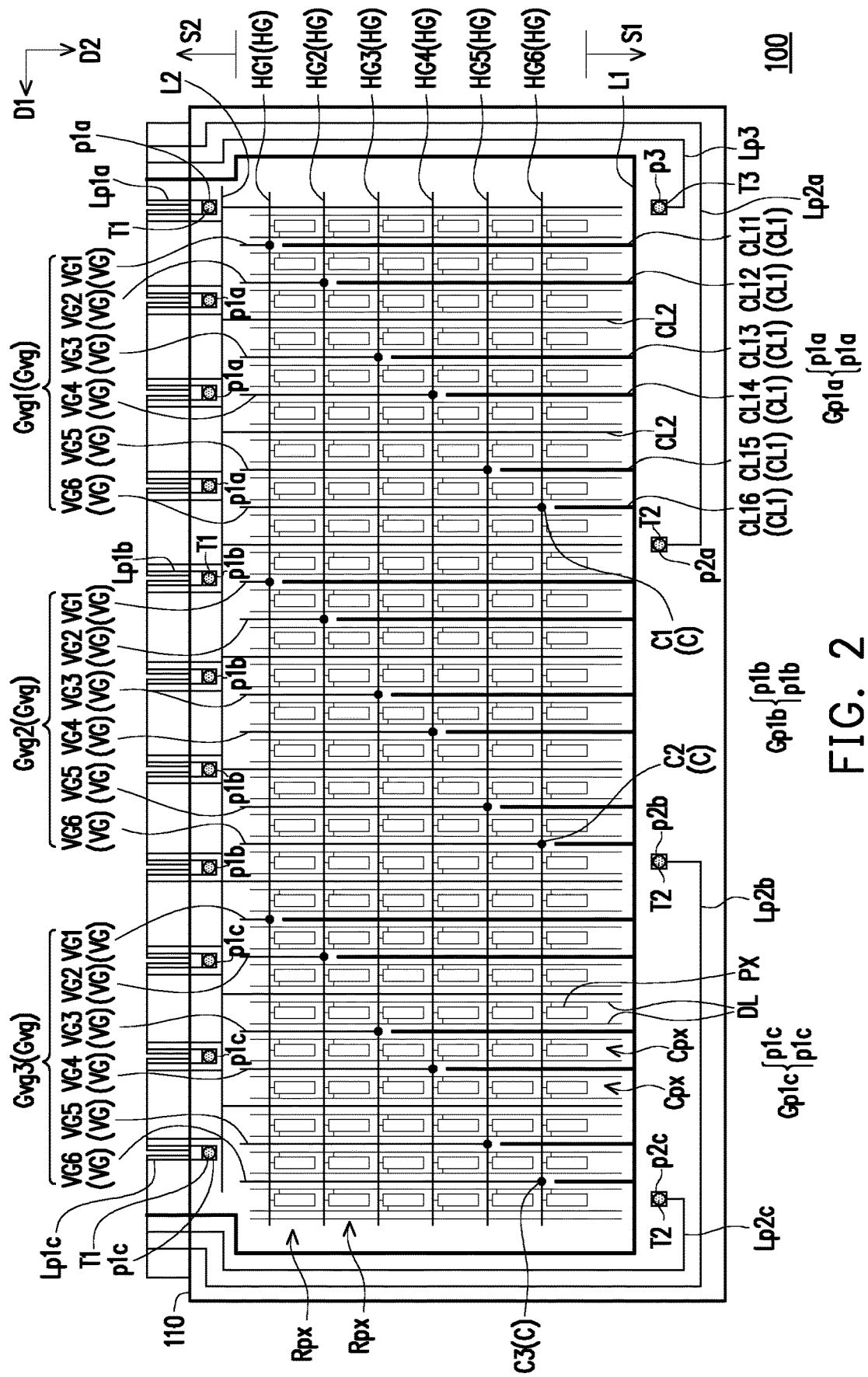
FIG. 2 is a schematic top view of a pixel array substrate 100, a plurality of first transfer elements T1, a plurality of second transfer elements T2, and a third transfer element T3 according to an embodiment of the disclosure.

FIG. 2 is a schematic top view of a pixel array substrate 100, a plurality of first transfer elements T1, a plurality of second transfer elements T2, and a third transfer element T3 according to an embodiment of the disclosure.

As shown in FIG. 1 and FIG. 2, the element layer 120 of the pixel array substrate 100 includes a plurality of data lines DL, a plurality of first gate lines HG, a plurality of pixel structures PX, and a plurality of second gate lines VG.

As shown in FIG. 2, the data lines DL are configured on the first substrate 110 and are arranged in a first direction D1. The first gate lines HG are configured on the first substrate 110, and are arranged in a second direction D2, in which the first direction D1 crisscrosses the second direction D2. For example, in the present embodiment, the first direction D1 and the second direction D2 may be substantially perpendicular to each other, but the present disclosure is not limited thereto.

In the present embodiment, the data lines DL and the first gate lines HG belong to different film layers. For example, in the present embodiment, the first gate lines HG may belong to a first metal layer while the data lines DL may belong to a second metal layer, but the present disclosure is not limited thereto. Based on consideration of conductivity, in the present embodiment, the data lines DL and the first gate lines HG are made of metal materials, but the disclosure is not limited thereto. In other embodiments, the data lines DL and/or the first gate lines HG may also be made of other conductive materials, such as alloys, nitrides of metal materials, oxides of metal materials, oxynitrides of metal materials, or stacked layers of metal materials and other conductive materials.

The pixel structures PX are configured on the first substrate 110 and are electrically connected to the data lines DL and the first gate lines HG. Specifically speaking, in the present embodiment, each of the pixel structures PX may include a thin-film transistor (not illustrated) and a pixel electrode (not illustrated), in which the thin-film transistor has a first end, a second end, and a control end. The first end of the thin-film transistor is electrically connected to a corresponding data line DL. The control end of the thin-film transistor is electrically connected to a corresponding first gate line HG. And the second end of the thin-film transistor is electrically connected to the pixel electrode.

The second gate lines VG are configured on the first substrate 110, in which the data lines DL and the second gate lines VG are arranged in the first direction, and the second gate lines VG are electrically connected to the first gate lines HG.

Specifically speaking, in the present embodiment, the pixel structures PX are arranged in a plurality of pixel columns Cpx and a plurality of pixel rows Rpx. The pixel columns Cpx are arranged in the first direction D1, and the pixel structures PX of each of the pixel columns Cpx are arranged in the second direction D2. The pixel rows Rpx are arranged in the second direction D2, and the pixel structures PX of each of the pixel rows Rpx are arranged in the first direction D1. In the top view of the pixel array substrate 100, each of the second gate lines VG is configured between two adjacent pixel columns Cpx. In other words, the second gate lines VG are interwoven in an active area of the pixel array substrate 100, and each of the second gate lines VG is electrically connected to at least one corresponding first gate line HG in the active area.

For example, in the present embodiment, the first gate lines HG include a first gate line HG1, a first gate line HG2, a first gate line HG3, a first gate line HG4, a first gate line HG5, and a first gate line HG6, which are arranged in sequence in the second direction D2; and the second gate lines VG include a second gate line VG1, a second gate line VG2, a second gate line VG3, a second gate line VG4, a second gate line VG5, and a second gate line VG6, which are arranged in sequence in the first direction D1 and may be electrically connected respectively to the first gate line HG1, the first gate line HG2, the first gate line HG3, the first gate HG4, the first gate line HG5, and the first gate line HG6. However, the present embodiment is not limited thereto. In other embodiments, the second gate lines VG may also be connected to the first gate lines HG by other means.

In FIG. 1 and FIG. 2, it is worthy of note that the element layer 120 of the pixel array substrate 100 further includes a plurality of first common lines CL1. As shown in FIG. 2, the first common lines CL1 are configured on the first substrate 110. In a top view of the pixel array substrate 100, each of the first common lines CL1 and the corresponding second gate line VG are configured between two adjacent pixel columns Cpx. The first common line CL1 and the corresponding second gate line VG are configured respectively on the opposite sides of the first gate line HG which is electrically connected to the second gate line VG. And the first common line CL1 is structurally separated from the corresponding second gate line VG.

For example, in the present embodiment, the second gate lines VG include the second gate line VG1, the second gate line VG2, the second gate line VG3, the second gate line VG4, the second gate line VG5, and the second gate line VG6, which are respectively electrically connected to the first gate line HG1, the first gate line HG2, the first gate line HG3, the first gate line HG4, the first gate line HG5, and the first gate line HG6. The first common lines CL1 include a first common line CL11, a first common line CL12, a first common line CL13, a first common line CL14, a first common line CL15, and a first common line CL16, which correspond respectively to the second gate line VG1, the second gate line VG2, the second gate line VG3, the second gate line VG4, the second gate line VG5, and the second gate line VG6. In a top view of the pixel array substrate 100, the first common line CL11 and the second gate line VG1 are respectively configured on the opposite sides of the first gate line HG1 which is electrically connected to the second gate line VG1, and the first common line CL11 is structurally separated from the second gate line VG1; the first common line CL12 and the second gate line VG2 are respectively configured on the opposite sides of the first gate line HG2 which is electrically connected to the second gate line VG2, and the first common line CL12 is structurally separated from the second gate line VG2; the first common line CL13 and the second gate line VG3 are respectively configured on the opposite sides of the first gate line HG3 which is electrically connected to the second gate line VG3, and the first common line CL13 is structurally separated from the second gate line VG3; the first common line CL14 and the second gate line VG4 are respectively configured on the opposite sides of the first gate line HG4 which is electrically connected to the second gate line VG4, and the first common line CL14 is structurally separated from the second gate line VG4; the first common line CL15 and the second gate line VG5 are respectively configured on the opposite sides of the first gate line HG5 which is electrically connected to the second gate line VG5, and the first common line CL15 is structurally separated from the second gate line VG5; and the first common line CL16 and the second gate line VG6 are respectively configured on the opposite sides of the first gate line HG6 which is electrically connected to the second gate line VG6, and the first common line CL16 is structurally separated from the second gate line VG6.

It is worthy of note that, whether or not the second gate lines VG are provided next to the pixel structures PX, with the configuration of the first common lines CL1, the pixel structures PX may sense the same or similar distribution of electric field, and thereby improving the display quality.

In the present embodiment, a signal of the first common lines CL1 and a gate-off signal of the second gate lines VG are substantially the same. Specifically speaking, in the present embodiment, whether a signal of the second gate lines VG is a gate-close signal or a gate-open signal, a signal of the first common lines CL1 may be fixed to be the gate-close signal. For example, in the present embodiment, the gate-close signal may be a DC signal between −9 volts and −10 volts, but the disclosure is not limited thereto.

In the present embodiment, the first common lines CL1 and the first gate lines HG belong to different film layers. For example, in the present embodiment, the first gate lines HG may belong to a first metal layer while the first common lines CL1 may belong to a second metal layer, but the disclosure is not limited thereto. Based on the consideration of conductivity, in the present embodiment, the material of the first common lines CL1 is a metal material. However, the disclosure is not limited thereto. In other embodiments, the first common lines CL1 may also be made of other conductive materials, such as alloys, nitrides of a metal material, oxides of a metal material, oxynitrides of a metal material, or a stacked layer of metal materials and other conductive materials.

As shown in FIG. 1 and FIG. 2, in the present embodiment, the element layer 120 of the pixel array substrate 100 further includes a first peripheral line L1. As shown in FIG. 2, the first peripheral line L1 is configured on the first substrate 110 and is located on a first side S1 of the pixel structures PX. The first common lines CL1 are electrically connected to the first peripheral line L1.

As shown in FIG. 1 and FIG. 2, in the present embodiment, the element layer 120 of the pixel array substrate 100 further includes a plurality of second peripheral lines CL2. As shown in FIG. 2, the second common lines CL2 are configured on the first substrate 110, the second gate lines VG and the second common lines CL2 are arranged in the first direction D1, and each of the second common lines CL2 is configured between two adjacent pixel columns Cpx. Specifically speaking, there are multiple layout areas between the pixel columns Cpx, and the second common lines CL2 are configured on the layout areas where the second gate lines VG and the first common lines CL1 are not provided.

In the present embodiment, the second common lines CL2 and the first gate lines HG belong to different film layers. For example, in the present embodiment, the first gate lines HG may belong to a first metal layer while the second common lines CL2 may belong to a second metal layer, but the disclosure is not limited thereto. Based on the consideration of conductivity, in the present embodiment, the material of the second common lines CL2 is a metal material. However, the disclosure is not limited thereto. In other embodiments, the second common lines CL2 may also be made of other conductive materials, such as alloys, nitrides of a metal material, oxides of a metal material, oxynitrides of a metal material, or a stacked layer of metal materials and other conductive materials.

As shown in FIG. 1 and FIG. 2, in the present embodiment, the element layer 120 of the pixel array substrate 100 further includes a second peripheral line L2. As shown in FIG. 2, the second peripheral line L2 is configured on the first substrate 110 and is located on a second side S2 of the pixel structures PX, and the second common lines CL2 are electrically connected to the second peripheral line L2.

In the present embodiment, an end of each of the second common lines CL2 being close to the second peripheral line L2 is electrically connected to the second peripheral line L2, and the other end of each of the second common lines CL2 being remote from the second peripheral line L2 may be separated from the first peripheral line L1 selectively, but the disclosure is not limited thereto.

As shown in FIG. 2, each of the first gate lines HG is electrically connected to n number of the second gate lines VG, in which n is a positive integer, and each of the first gate lines HG and the n number of the second gate lines VG have the $1^{st}$ to $n^{th}$ connection points (or contact points) C arranged in sequence in the first direction D1. And the second gate lines VG include the $1^{st}$ to $n^{th}$ second line groups Gvg arranged in sequence in the first direction D1, and the second gate lines VG of the $m^{th}$ second gate line group Gvg of the $1^{st}$ to $n^{th}$ second gate line groups Gvg and the corresponding first gate lines HG have the $m^{th}$ connection point C of the $1^{st}$ to $n^{th}$ connection points C, in which m is a positive integer, and n≥m≥1.

For example, in the present embodiment, n=3; thus, each of the first gate lines HG is electrically connected to three corresponding second gate lines VG, and each of the first gate lines HG and the three corresponding second gate lines VG have the $1^{st}$ to $3^{rd}$ connection points C1, C2, and C3 arranged in sequence in the first direction D1. And the second gate lines VG include the $1^{st}$ to $3^{rd}$ second gate line groups Gvg1, Gvg2, and Gvg3 arranged in sequence in the first direction D1, in which the second gate lines VG1 to VG6 of the first second gate line group Gvg1 and the corresponding first gate lines HG1 to HG6 have the $1^{st}$ connection points C1, the second gate lines VG1 to VG6 of the $2^{nd}$ second gate line group Gvg2 and the corresponding first gate lines HG1 to HG6 have the 2nd connection points C2, and the second gate lines VG1 to VG6 of the $3^{rd}$ second gate line group Gvg3 and the corresponding first gate lines HG1 to HG6 have the 3rd connection points C3.

Figure 3:
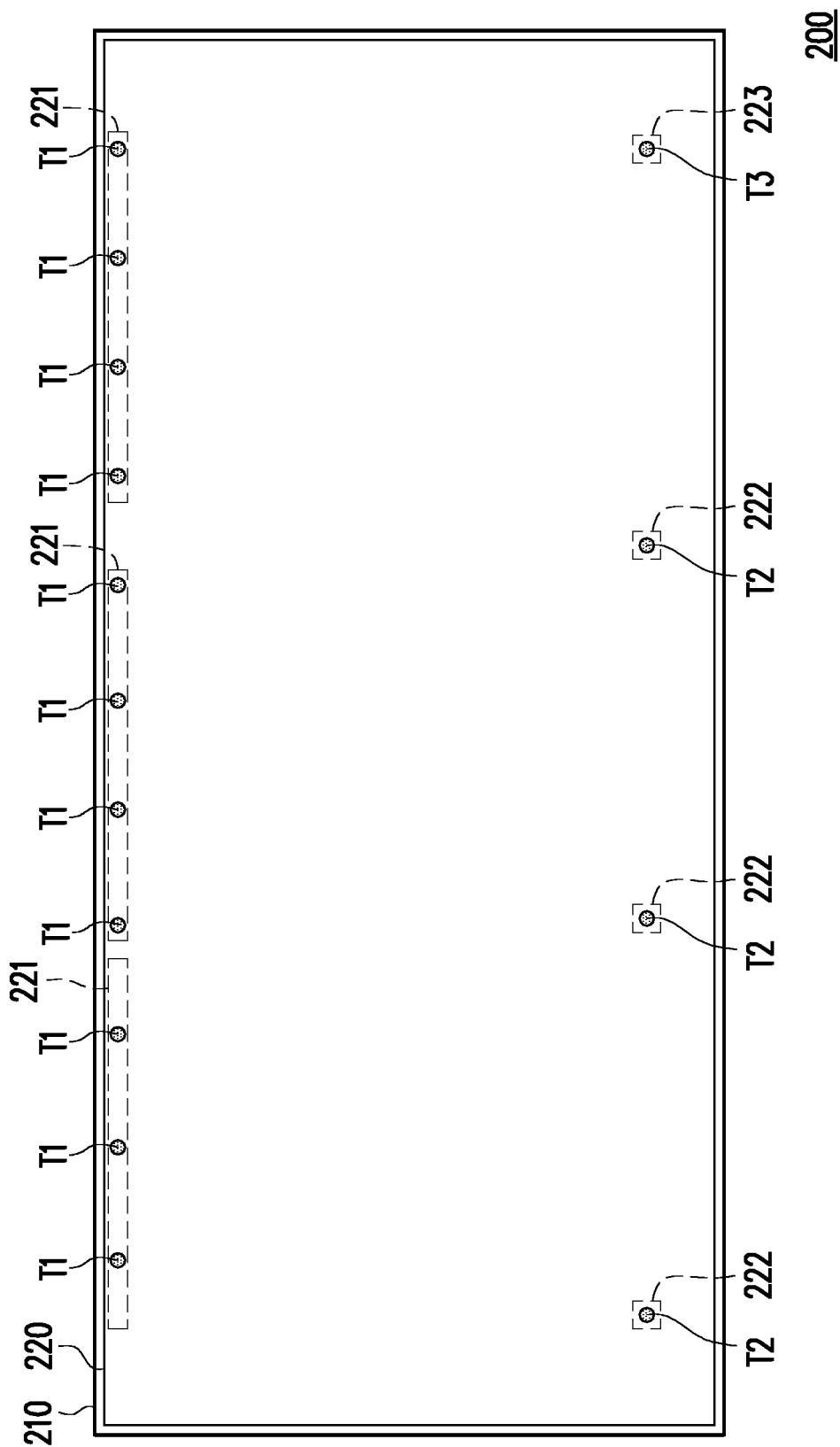
FIG. 3 is a schematic top view of an opposite substrate 200, a plurality of first transfer elements T1, a plurality of second transfer elements T2, and a third transfer element T3 according to an embodiment of the disclosure.

FIG. 3 is a schematic top view of an opposite substrate 200, a plurality of first transfer elements T1, a plurality of second transfer elements T2, and a third transfer element T3 according to an embodiment of the disclosure.

As shown in FIG. 1 and FIG. 3, in the present embodiment, the opposite substrate 200 of the display apparatus 10 may include selectively a common electrode 220, in which the common electrode 220 is configured on the second substrate 210 and is located between the second substrate 210 and the display medium 300. As shown in FIG. 2 and FIG. 3, in the present embodiment, the common electrode 220 is a wall-shaped electrode which overlaps all the pixel structures PX, but the disclosure is not limited hereto.

In the present embodiment, the common electrode 220 may be, for example, a transparent conductive layer which includes metal oxides, such as indium tin oxide, indium zinc oxide, aluminum tin oxide, aluminum zinc oxide, indium germanium zinc oxide, or other suitable oxides, or a stacked layer of at least two of the above, but the disclosure is not limited thereto.

As shown in FIG. 1 and FIG. 2, in the present embodiment, the element layer 120 of the pixel array substrate 100 further includes a plurality of common pad groups Gp1a, Gp1b, and Gp1c as well as n number of a plurality of second common pads p2a, p2b, and p2c. As shown in FIG. 2, the common pad groups Gp1a, Gp1b, and Gp1c are configured on the first substrate 110, and are configured to correspond respectively to the $1^{st}$ to $n^{th}$ second gate line groups Gvg1, Gvg2, and Gvg3, and are located on the second side S2 of the pixel structures PX. Each of the common pad groups Gp1a, Gp1b, and Gp1c include a plurality of first common pads p1a, p1b, and p1c which are structurally separated. And the n number of the second common pads p2a, p2b, and p2c are configured on the first substrate 110, and are configured to correspond respectively to the $1^{st}$ to $n^{th}$ second gate line groups Gvg1, Gvgl2, and Gvgl3, and are located on the first side S1 of the pixel structures PX.

For example in the present embodiment, n=3; thus, the pixel array substrate 100 includes three common pad groups Gp1a, Gp1b, and Gp1c as well as three second common pads p2a, p2b, and p2c. The three common pad groups Gp1a, Gp1b, and Gp1c are configured to correspond to the $1^{st}$ to $3^{rd}$ second gate line groups Gvg1, Gvgl2, and Gvgl3, and are located on the second side S2 of the pixel structures PX. The three second common pads p2a, p2b, and p2c are configured on the first substrate 110, and are configured to correspond respectively to the $1^{st}$ to $3^{rd}$ second gate line groups Gvg1, Gvgl2, and Gvgl3, and are located on the first side S1 of the pixel structures PX.

In the present embodiment, the first common pads p1a of the same common pad group Gp1a are dispersed on one side of the second gate lines VG1 to VG6 of the corresponding second gate line group Gvg1; the second common pad p2a which corresponds to the second gate line group Gvg1 is configured on the other side of the second gate lines VG1 to VG6 of the second gate line group Gvg1; and, the second common pad p2a may be located next to the longest second gate line VG6 of the second gate line group Gvg1.

As shown in FIG. 1, FIG. 2, and FIG. 3, in the present embodiment, the display apparatus 10 further includes the first transfer elements T1 which are configured between the element layer 120 of the pixel array substrate 100 and the common electrode 220 of the opposite substrate 200. The first transfer elements T1 are configured respectively on the first common pads p1a, p1b, and p1c of the common pad groups Gp1a, Gp1b, and Gp1c, and are electrically connected to the first common pads p1a, p1b, and p1c and a first part 221 of the common electrode 220.

In the present embodiment, the display apparatus 10 further includes n number of the second transfer elements T2 which are configured between the element layer 120 of the pixel array substrate 100 and the common electrode 220 of the opposite substrate 200. And the n number of the second transfer elements T2 are configured respectively on the n number of the second common pads p2a, p2b, and p2c, and are electrically connected to the n number of the second common pads p2a, p2b, and p2c and a second part 222 of the common electrode 220.

In the present embodiment, the common pad group Gp1a and the second common pad p2a correspond to the same second gate line group Gvg1, and the potential of the second common pad p2a is greater than the potentials of the first common pads p1a of the common pad group Gp1a. By doing so, a potential distribution forms between the first part 221 and the second part 222 of the common electrode 220 which are electrically connected respectively to the first transfer element T1 configured on the first common pad p1a and the second transfer element T2 configured on the second common pad p2a. The potential distribution may compensate for the difference in brightness caused by the different impedances of the second gate lines VG1 to VG6 of the second gate line group Gvg1.

In the present embodiment, the first common pads p1a, p1b, and p1c are electrically connected to a drive element (not illustrated) respectively through a plurality of wires Lp1a, Lp1b, and Lp1c, and the second common pads p2a, p2b, and p2c are electrically connected to a drive element (not illustrated) respectively through a plurality of wires Lp2a, Lp2b, and Lp2c, and the wires Lp1a, Lp1b, Lp1c, Lp2a, Lp2b, and Lp2c are structurally separated from each other. In other words, the potentials of the first common pads p1a, p1b, and p1c and the second common pads p2a, p2b, and p2c may be controlled independently. The magnitude of the potentials of the first common pads p1a, p1b, and p1c and the second common pads p2a, p2b, p2c may be adjusted according to actual needs.

As shown in FIG. 1 and FIG. 2, in the present embodiment, the element layer 120 of the pixel array substrate 100 further includes a third common pad p3. As shown in FIG. 2, the third common pad p3 is configured on the first substrate 110, and is located on the first side S1 of the pixel structures PX. The third common pad p3 and the second common pads p2a, p2b, and p2c are arranged in sequence in the first direction D1 and are structurally separated from each other. The third common pad p3 is configured to correspond to the $1^{st}$ second gate line group Gvg1. And the potential of the third common pad p3 is greater than the potentials of the second common pads p2a, p2b, and p2c. In the present embodiment, the potential of the third common pad p3 is also greater than the potentials of the first common pads p1*a*, p1*b*, and p1*c*. For example, the potential difference between the third common pad p3 and any one of the first common pads p1*a*, p1*b*, and p1*c* may be 1 volt or more, but the disclosure is not limited thereto.

As shown in FIG. 1, FIG. 2, and FIG. 3, in the present embodiment, the display apparatus 10 further includes the third transfer elements T3 which is configured between the element layer 120 of the pixel array substrate 100 and the common electrode 220 of the opposite substrate 200. The third transfer element T3 is configured on the third common pad p3, and is electronically connected to the third common pad p3 and a third part 223 of the common electrode 220.

In the present embodiment, the third common pad p3 is electrically connected to the drive element through a wire Lp3, and the wire Lp3 are structurally separated from the wires Lp1*a*, Lp1*b*, Lp1*c*, Lp2*a*, Lp2*b*, and Lp2*c* which are electrically connected to the first common pads p1*a*, p1*b*, and p1*c* and the second common pads p2*a*, p2*b*, and p2*c*. In other words, the potential of the third common pad p3 may be controlled independently. And the magnitude of the potential of the third common pad p3 may be adjusted according to actual needs.

In the present embodiment, the first transfer element T1, the second transfer element T2, and the third transfer element T3 include a conductive ball (for example, a gold ball), but the disclosure is not limited thereto.

It is to be noted that the following embodiments use the reference numerals and a part of the contents of the above embodiments, and the same reference numerals are used to denote the same or similar elements, and the description of the same technical contents is omitted. For the description of the omitted part, reference may be made to the above embodiments, and its details are not described in the following embodiments.

Figure 4:
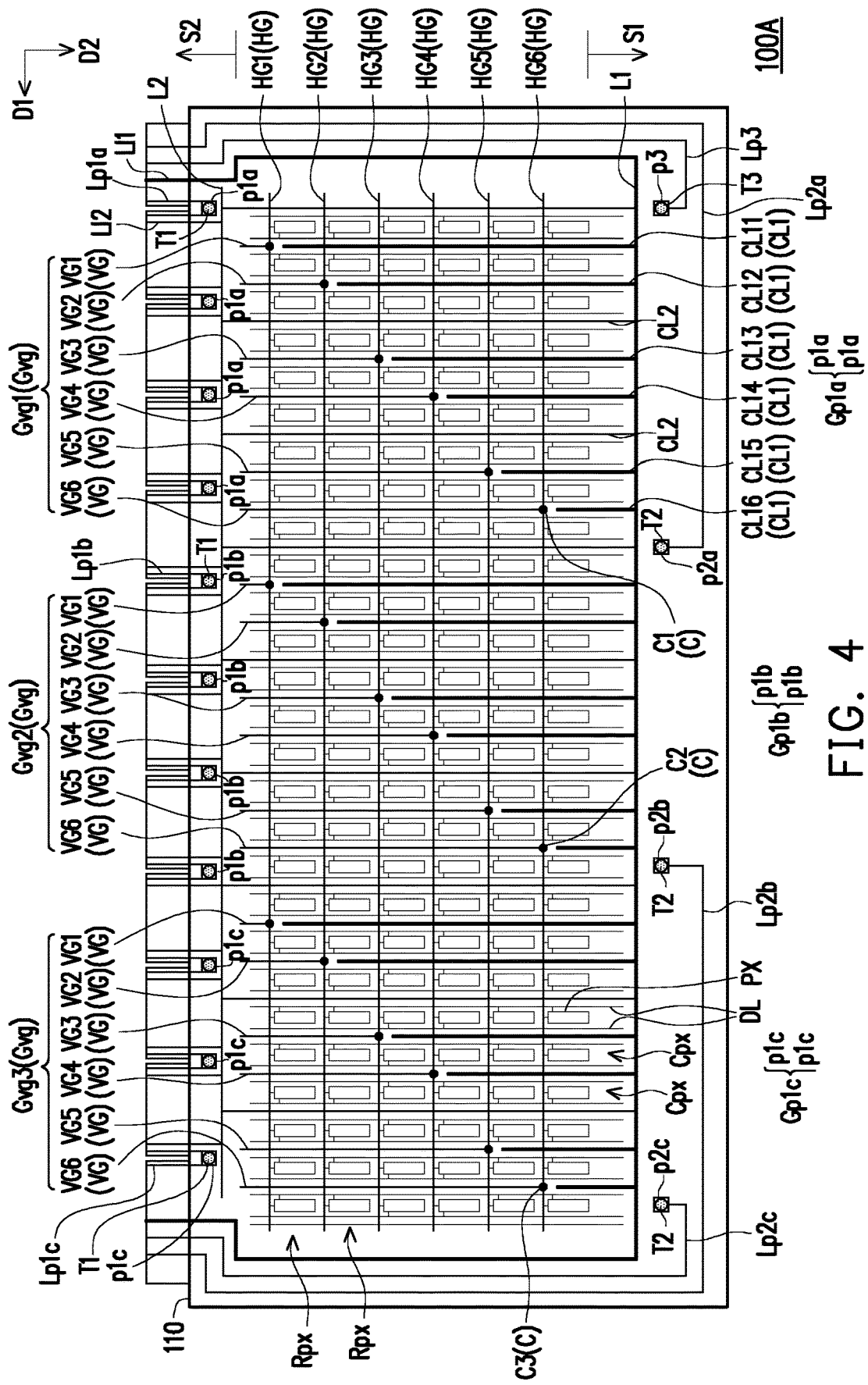
FIG. 4 is a schematic top view of a pixel array substrate 100A, a plurality of first transfer elements T1, a plurality of second transfer elements T2, and a third transfer element T3 according to an embodiment of the disclosure.

FIG. 4 is a schematic top view of a pixel array substrate 100A, a plurality of first transfer elements T1, a plurality of second transfer elements T2, and a third transfer element T3 according to an embodiment of the disclosure.

The pixel array substrate 100A of FIG. 4 is similar to the pixel array substrate 100 of FIG. 2. The difference between the two is that in the embodiment of FIG. 4, both ends of each second common line CL2 may be electrically connected to a first peripheral line L1 and a second peripheral line L2.

As shown in FIG. 4, in the present embodiment, a signal input to the first peripheral line L1 and a signal input to the second peripheral line L2 may be controlled independently. Specifically speaking, the first peripheral line L1 and the second peripheral line L2 are electrically connected to the drive element through respective wire L11 and wire L12, and the wire L11 and wire L12 are structurally separated from each other. For example, in the present embodiment, a signal input to the first peripheral line L1 and a signal input to the second peripheral line L2 may be selectively the same. For example, a signal input to the first peripheral line L1 and a signal input to the second peripheral line L2 may both be the same with a gate-close signal of a plurality of second gate lines VG. However, the disclosure is not limited thereto. In other embodiments, a signal input to the first peripheral line L1 and a signal input to the second peripheral line L2 may also be different.

Figure 5:
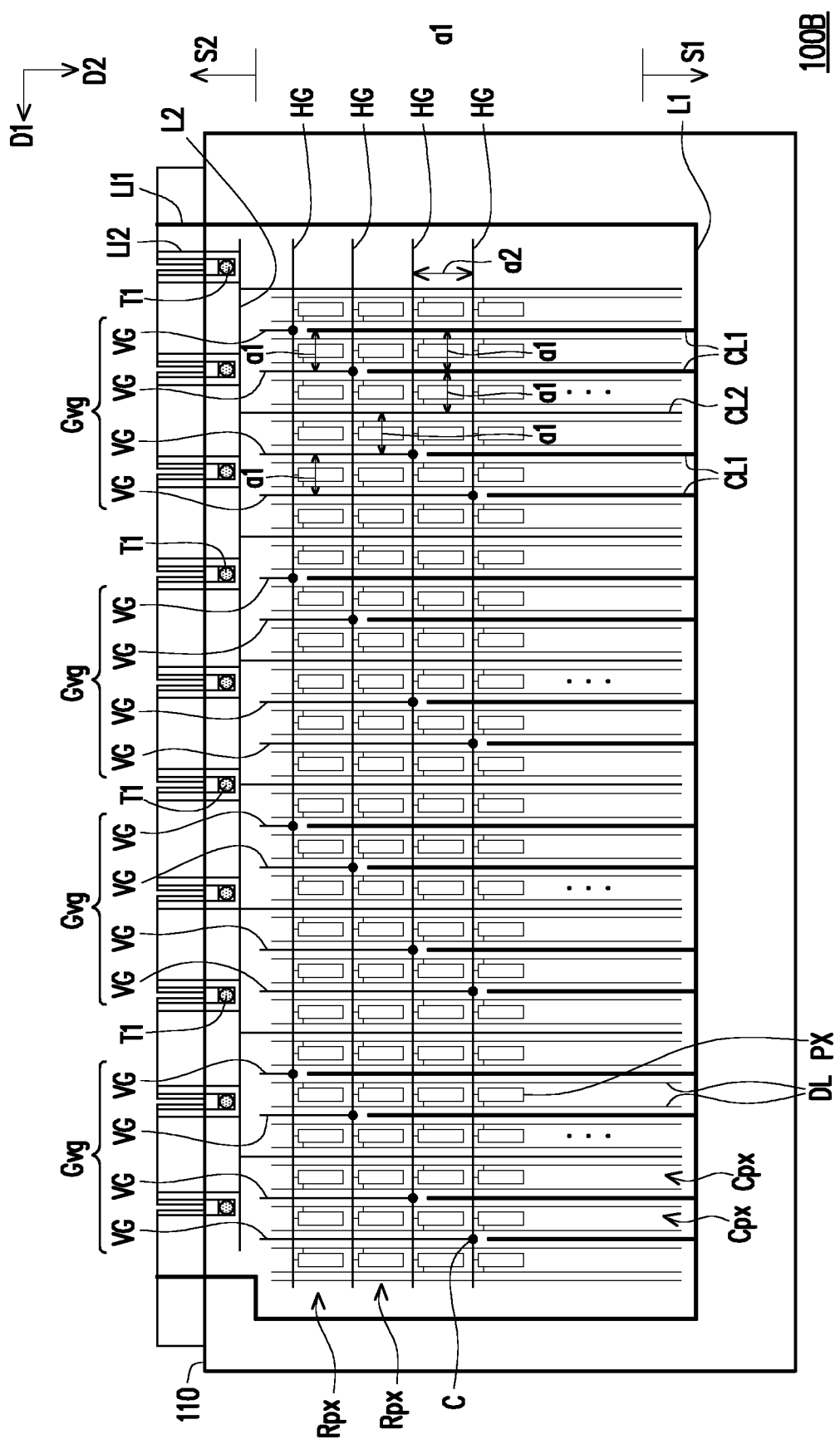
FIG. 5 is a schematic top view of a pixel array substrate 100B and a plurality of first transfer elements T1 according to an embodiment of the disclosure.

FIG. 5 is a schematic top view of a pixel array substrate 100B and a plurality of first transfer elements T1 according to an embodiment of the disclosure.

The pixel array substrate 100B of FIG. 5 is similar to the pixel array substrate 100 of FIG. 2. The difference between the two is that in the embodiment of FIG. 2, n is 3, that is, each of the first gate lines HG are electrically connected to three second gate lines VG. However, in the embodiment of FIG. 5, n is 4, that is, each of a plurality of first gate lines HG is electrically connected to four second gate lines VG. However, the disclosure is not limited thereto. The number (i.e., n) of the second gate lines VG electrically connected to each of the first gate lines HG may be determined according to actual needs.

Specifically speaking, the pixel structures PX are arranged in x number of pixel columns Cpx and y number of pixel rows Rpx, in which the x number of the pixel columns Cpx are arranged in a first direction D1 and y number of pixel rows Rpx are arranged in a second direction D2. In the above arrangement, x and y are positive integers greater than 2. Each pixel structure PX has a first width a1 and a second width a2 respectively in the first direction D1 and the second direction D2. The first width a1 may refer to the following distances: the distance between two adjacent second gate lines VG located respectively on the left and right sides of the same pixel structure PX, the distance between a second gate line VG and a first common line CL1 which are adjacent to each other and located respectively on the left and right sides of the same pixel structure PX, the distance between two adjacent first common lines CL1 located on the left and right sides of the same pixel structure PX, the distance between a first common line CL1 and a second common line CL2 adjacent to each other and located respectively on the left and right sides of the same pixel structure PX, or the distance between a second gate line VG and a second common line CL2 which are adjacent to each other and located respectively on the left and right sides of the same pixel structure PX. The second width a2 may refer to the distance between two adjacent first gate lines HG located on the upper and lower sides of the same pixel structure PX. If $(a1 \cdot x + a2 \cdot y) < 2000000$, then n is preferably equal to 2. If $2000000 < (a1 \cdot x + a2 \cdot y) < 2400000$, then n is preferably equal to 3. If $2400000 < (a1 \cdot x + a2 \cdot y) < 3000000$, then n is preferably equal to 4. If $(a1 \cdot x + a2 \cdot y) > 3000000$, then n is preferably equal to 5.

Figure 6:
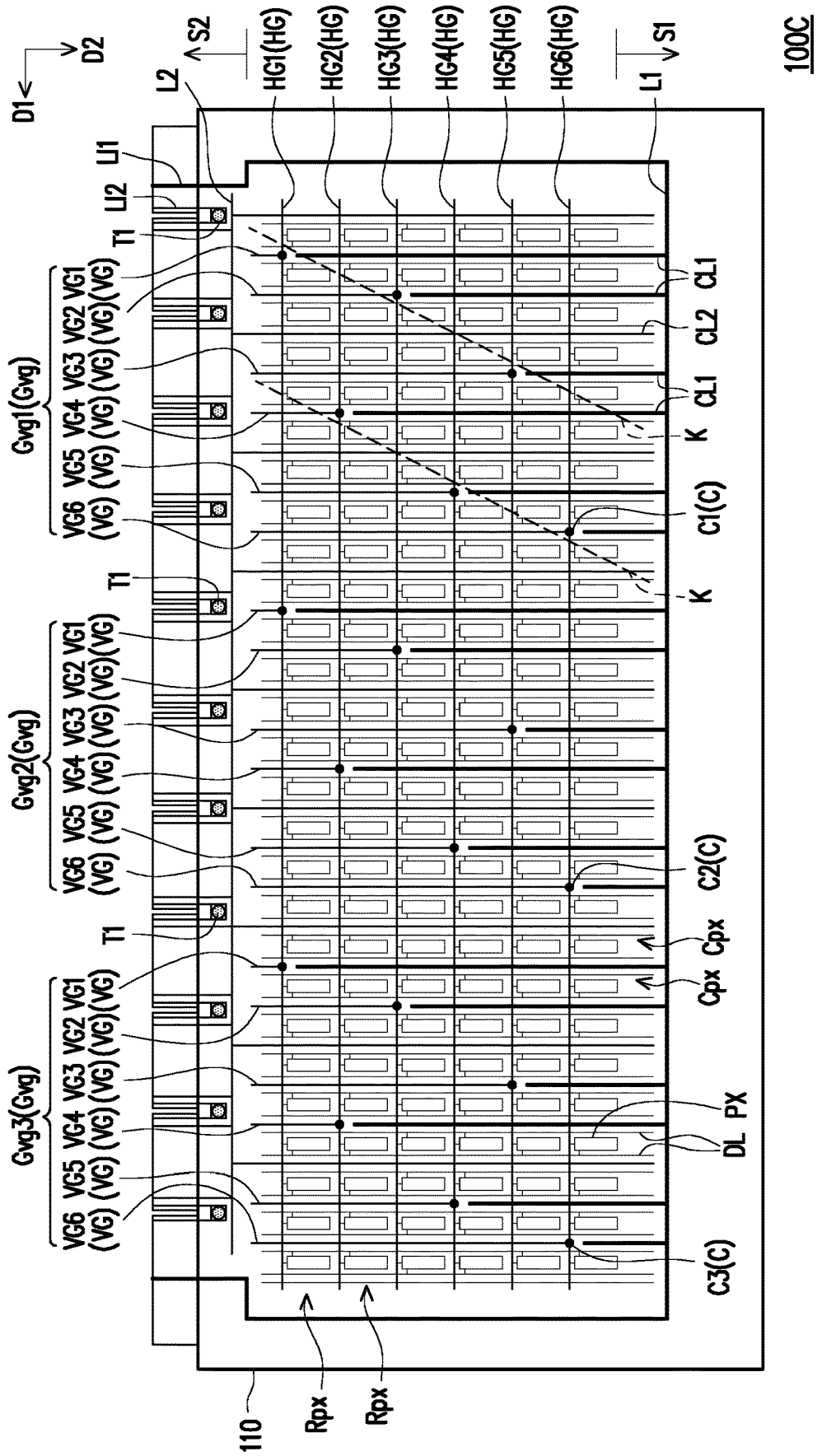
FIG. 6 is a schematic top view of a pixel array substrate 100C and a plurality of first transfer elements T1 according to an embodiment of the disclosure.

FIG. 6 is a schematic top view of a pixel array substrate 100C and a plurality of first transfer elements T1 according to an embodiment of the disclosure.

The pixel array substrate 100C of FIG. 6 is similar to the pixel array substrate 100 of FIG. 2. The difference between the two is that the methods of connecting the second gate lines VG and the first gate lines HG are different.

As shown in FIG. 6, specifically speaking, in the present embodiment, a plurality of first gate lines HG are arranged in sequence in a second direction D2, and the first gate lines HG include an odd number of the first gate lines HG and an even number of the first gate lines HG. The odd number of the first gate lines HG include the $(1+2 \cdot K)^{th}$ first gate line HG, in which K=0, 1, . . . , p, and p is a positive integer greater than or equal to 2. The even number of the first gate lines HG include the $2L^{th}$ first gate line HG, in which L=1, 2, . . . , q, and q is a positive integer greater than or equal to 3. The second gate lines VG include the $1^{st}$ to $(p+1)^{th}$ second gate lines VG and the $(p+2)$ to $(p+q+1)^{th}$ second gate lines VG arranged in sequence in the first direction D1. The $1^{st}$ to $(p+1)^{th}$ second gate lines VG are electrically connected respectively to the $(1+2 \cdot K)^{th}$ first gate line HG, and the $(p+2)$ to $(p+q+1)^{th}$ second gate lines VG are electrically connected respectively to the $2L^{th}$ first gate line HG.

For example, in the present embodiment, p=2, K=0, 1, and 2, and the odd number of the first gate lines HG include the 1st, 3rd, and 5th first gate lines HG1, HG3, and HG5; q=3, L=1, 2, and 3, the even number of the first gate lines HG include the 2nd, 4th, and 6th first gate lines HG2, HG4, and HG6; the second gate lines VG include the $1^{st}$ to $3^{rd}$ second gate lines VG1 to VG3 and the 4th to 6th second gate lines VG4 to VG6 arranged in sequence in the first direction D1; the $1^{st}$ to $3^{rd}$ second gate lines VG1 to VG3 are electronically connected respectively to the $1^{st}$ $3^{rd}$ and $5^{th}$ first gate lines HG1, HG3, and HG5, and the $4^{th}$ to $6^{th}$ second gate lines VG4 to VG6 are electrically connected respectively to the $2^{nd}$, $4^{th}$ and $6^{th}$ gates lines HG2, HG4, and HG6. In other words, in the present embodiment, the connection points C of the second gate lines VG from the same second gate line group Gvg and the first gate lines HG (for example: the connection points C of the $1^{st}$ to $3^{rd}$ second gate lines VG1 to VG3 and the $1^{st}$, $3^{rd}$, and $5^{th}$ first gate lines HG1, HG3, and HG5, and the connection points C of the $4^{th}$ to $6^{th}$ second gate lines VG4 to VG6 and the $2^{nd}$, $4^{th}$, and $6^{th}$ of the first gate lines HG2, HG4, and HG6) may be distributed generally along multiple diagonal lines K that are parallel to each other.

Figure 7:
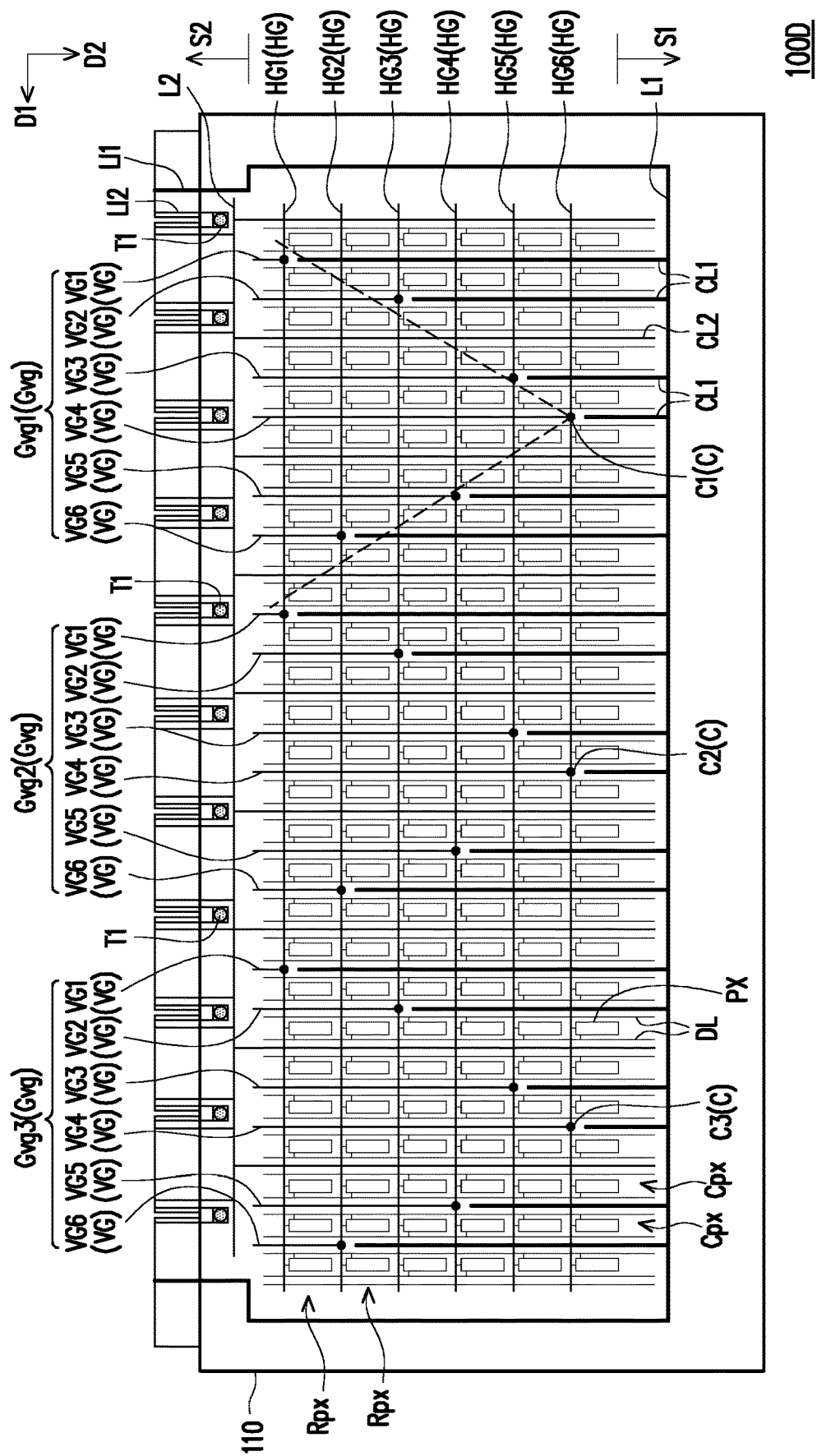
FIG. 7 is a schematic top view of a pixel array substrate 100D and a plurality of first transfer elements T1 according to an embodiment of the disclosure.

FIG. 7 is a schematic top view of a pixel array substrate 100D and a plurality of first transfer elements T1 according to an embodiment of the disclosure.

The pixel array substrate 100D of FIG. 7 is similar to the pixel array substrate 100 of FIG. 2. The difference between the two is that the methods of connecting the second gate lines VG and the first gate lines HG are different.

As shown in FIG. 7, specifically speaking, in the present embodiment, a plurality of first gate lines HG are arranged in sequence in a second direction D2, and the first gate lines HG include an odd number of first gate lines HG and an even number of first gate lines HG. The odd number of the first gate lines HG include the $(1+2 \cdot K)^{th}$ first gate line HG, in which K=0, 1, ..., p, and p is a positive integer greater than or equal to 2. The even number of the first gate lines HG include the $2L^{th}$ first gate line HG, in which L=1, 2, ..., q, and q is a positive integer greater than or equal to 3. The second gate lines VG include the $1^{st}$ to $(p+1)^{th}$ second gate lines VG and the $(p+2)$ to $(p+q+1)^{th}$ second gate lines VG arranged in sequence in the first direction D1. The $1^{st}$ to $(p+1)^{th}$ second gate lines VG are electrically connected respectively to the $(1+2 \cdot K)^{th}$ first gate lines HG, and the $(p+1)$ to $(p+q+1)^{th}$ second gate lines VG are electrically connected respectively to the $2L^{th}$ first gate line HG.

For example, in the present embodiment, p=2, K=0, 1, and 2, and the odd number of the first gate lines HG include the $1^{st}$, $3^{rd}$, and $5^{th}$ first gate lines HG1, HG3, and HG5; q=3, L=1, 2, and 3, the even number of the first gate lines HG include the $2^{nd}$, $4^{th}$, and $6^{th}$ first gate lines HG2, HG4, and HG6; the second gate lines VG include the $1^{st}$ to $3^{rd}$ second gate lines VG1 to VG3 and the $4^{th}$ to $6^{th}$ second gate lines VG4 to VG6 arranged in sequence in the first direction D1; the $1^{st}$ to $3^{rd}$ second gate lines VG1 to VG3 are electronically connected respectively to the $1^{st}$, $3^{rd}$, and $5^{th}$ first gate lines HG1, HG3, and HG5, and the $6^{th}$ to $4^{th}$ second gate lines VG6 to VG4 are electrically connected respectively to the $2^{nd}$, $4^{th}$ and $6^{th}$ first gates lines HG2, HG4, and HG6. In other words, in the present embodiment, a plurality of connection points C of the second gate lines VG from the same second gate line group Gvg and the first gate lines HG (for example, the connection points C of the $1^{st}$ to $3^{rd}$ second gate lines VG1 to VG3 and the $1^{st}$, $3^{rd}$, and $5^{th}$ first gate lines HG1, HG3, and HG5, and the connection points C of the $6^{th}$ to $4^{th}$ second gate lines VG6 to VG4 and the $2^{nd}$, $4^{th}$, and $6^{th}$ of the first gate lines HG2, HG4, and HG6) are distributed generally in a V-shaped pattern.

What is claimed is:

1. A display apparatus, comprising:
a first substrate;
a plurality of data lines, configured on the first substrate and arranged in a first direction;
a plurality of first gate lines, configured on the first substrate, and arranged in a second direction, wherein the first direction crisscrosses the second direction;
a plurality of pixel structures, configured on the first substrate and electrically connected to the data lines and the first gate lines;
a plurality of second gate lines, configured on the first substrate, wherein the data lines and the second gate lines are arranged in the first direction, and the second gate lines are electrically connected to the first gate lines;
a plurality of first common lines, configured on the first substrate, wherein the pixel structures are arranged in a plurality of pixel columns, the pixel columns are arranged in the first direction, each of the first common lines and the corresponding second gate line are configured between two adjacent pixel columns of the pixel columns, the first common line and the corresponding second gate line are configured respectively on the opposite sides of the first gate line which is electrically connected to the second gate line, and the first common line and the corresponding second gate line are structurally separated;
a second substrate, configured to be opposite to the first substrate; and
a display medium, configured between the first substrate and the second substrate.

2. The display apparatus according to claim 1, wherein a signal of the first common line and a gate-off signal of the second gate line are substantially the same.

3. The display apparatus according to claim 1, wherein each of the first gate lines is electrically connected to n number of the second gate lines, n is a positive integer, each of the first gate lines and the n number of the second gate lines have $1^{st}$ to $n^{th}$ connection points arranged in sequence in the first direction, the second gate lines include $1^{st}$ to $n^{th}$ second gate line groups arranged in sequence in the first direction, the second gate lines of $m^{th}$ second gate line group of the $1^{st}$ to $n^{th}$ second gate line groups and the corresponding first gate lines have $m^{th}$ connection point of the $1^{st}$ to $n^{th}$ connection points, m is a positive integer, and n≥m≥1, and the display apparatus further comprising:
a common electrode, configured on the second substrate and located between the second substrate and the display medium;
a plurality of common pad groups, configured on the first substrate, and configured to correspond respectively to the $1^{st}$ to $n^{th}$ second gate line groups, wherein the pixel structures have a first side and a second side opposite to each other, the common pad groups are configured on the second side of the pixel structures, and each of the common pad groups includes a plurality of first common pads;
a plurality of first transfer elements, configured respectively on the first common pads of the common pad groups, and electrically connected to the first common pads of the common pad groups and the common electrode;
n number of a plurality of second common pads, configured on the first substrate, and configured to correspond respectively to the $1^{st}$ to $n^{th}$ second gate line groups, and located on the first side of the pixel structures; and n number of a plurality of second transfer elements, configured respectively on the n number of the second common pads, and electrically connected to the n number of the second common pads and the common electrode, wherein a common pad group of the common pad groups and a second common pad of the n number of the second common pads correspond to the same second gate line group, and a potential of the second common pad is greater than a plurality of potentials of the first common pads of the common pad group.

4. The display apparatus according to claim 3, further comprising:

a third common pad, configured on the first substrate, and located on the first side of the pixel structures, wherein the third common pad and the second common pads are arranged in sequence in the first direction and are structurally separated from each other, the third common pad is configured to correspond to the $1^{st}$ second gate line group of the $1^{st}$ to $n^{th}$ second gate line groups, and a potential of the third common pad is greater than a plurality of potentials of the corresponding second common pads; and a third transfer element, configured on the third common pad, and electrically connected to the third common pad and the common electrode.

5. The display apparatus according to claim 1, further comprising:

a plurality of second common lines, configured on the first substrate, and the second gate lines and the second common lines are arranged in the first direction, wherein each of the second common lines is configured between two adjacent pixel columns of the pixel columns;

a first peripheral line, configured on the first substrate and located on a first side of the pixel structures, wherein the first common lines are electrically connected to the first peripheral line; and a second peripheral line, configured on the first substrate and located on a second side of the pixel structures, wherein two ends of each of the second common lines are electrically connected respectively to the first peripheral line and the second peripheral line.

6. The display apparatus according to claim 1, wherein the first gate lines include an odd number of the first gate lines and an even number of the first gate lines, the odd number of the first gate lines include $(1+2 \cdot K)^{th}$ first gate line, $K=0, 1, \ldots, p$, and p is a positive integer greater than or equal to 2, the even number of the first gate lines include $2L^{th}$ first gate line, $L=1, 2, \ldots, q$, and q is a positive integer greater than or equal to 3; the second gate lines include $1^{st}$ to $(p+1)^{th}$ second gate lines and $(p+2)$ to $(p+q+1)^{th}$ second gate lines arranged in sequence in the first direction; the $1^{st}$ to $(p+1)^{th}$ second gate lines are electrically connected to the $(1+2 \cdot K)^{th}$ first gate line, and the $(p+2)$ to $(p+q+1)^{th}$ second gate lines are electrically connected to the $2L^{th}$ first gate line.

7. The display apparatus according to claim 6, wherein a plurality of connection points of the $1^{st}$ to $(p+1)^{th}$ second gate lines and the $(1+2 \cdot K)^{th}$ first gate line as well as a plurality of connection points of the $(p+2)$ to $(p+q+1)^{th}$ second gate lines and the $2L^{th}$ first gate line are generally distributed along a plurality of diagonal lines parallel to each other.

8. The display apparatus according to claim 6, wherein a plurality of connection points of the $1^{st}$ to $(p+1)^{th}$ second gate lines and the $(1+2 \cdot K)^{th}$ first gate line as well as a plurality of connection points of the $(p+2)$ to $(p+q+1)^{th}$ second gate lines and the $2L^{th}$ first gate line are distributed generally in a V-shaped pattern.

9. A display apparatus, comprising:

a first substrate;

a plurality of data lines, configured on the first substrate and arranged in a first direction;

a plurality of first gate lines, configured on the first substrate, and arranged in a second direction, wherein the first direction crisscrosses the second direction;

a plurality of pixel structures, configured on the first substrate, electrically connected to the data lines and the first gate lines, and arranged in x number of pixel columns and y number of pixel rows, wherein the x number of pixel columns are arranged in the first direction, the y number of pixel rows are arranged in the second direction, x and y are positive integers greater than 2, and the pixel structure has a first width a1 and a second width a2 respectively in the first direction and the second direction;

a plurality of second gate lines, configured on the first substrate, wherein the data lines and the second gate lines are arranged in the first direction, and the second gate lines are electrically connected to the first gate lines;

a second substrate, configured to be opposite to the first substrate; and a display medium, configured between the first substrate and the second substrate, wherein each of the first gate lines is electronically connected to n number of the second gate lines;

$(a1 \cdot x + a2 \cdot y) < 2000000$, and $n=2$; or $2000000 < (a1 \cdot x + a2 \cdot y) < 2400000$, and $n=3$; or $2400000 < (a1 \cdot x + a2 \cdot y) < 3000000$, and $n=4$; or $(a1 \cdot x + a2 \cdot y) \geq 3000000$, and $n=5$.

10. The display apparatus according to claim 9, further comprising:

a plurality of first common lines, configured on the first substrate, wherein each of the first common lines and the corresponding second gate line are configured between two adjacent pixel columns of the x number of the pixel columns, the first common line and the corresponding second gate line are configured respectively on the opposite sides of the first gate line which is electrically connected to the second gate line, and the first common line and the corresponding second gate line are structurally separated.

11. The display apparatus according to claim 10, wherein a signal of the first common line and a gate-off signal of the second gate line are substantially the same.

12. The display apparatus according to claim 9, wherein each of the first gate lines is electrically connected to the n number of the second gate lines, n is a positive integer, each of the first gate lines and the n number of the second gate lines have $1^{st}$ to $n^{th}$ connection points arranged in sequence in the first direction, the second gate lines include $1^{st}$ to $n^{th}$ second gate line groups arranged in sequence in the first direction, and the second gate lines of $m^{th}$ second gate line group of the $1^{st}$ to $n^{th}$ second gate line groups and the corresponding first gate lines have $m^{th}$ connection point of the $1^{st}$ to $n^{th}$ connection points, m is a positive integer, and $n \geq m \geq 1$, and the display apparatus further comprising:

a common electrode, configured on the second substrate and is located between the second substrate and the display medium;

a plurality of common pad groups, configured on the first substrate, and configured to correspond respectively to the $1^{st}$ to $n^{th}$ second gate line groups, wherein the pixel structures have a first side and a second side opposite to each other, the common pad groups are configured on the second side of the pixel structures, and each of the common pad groups includes a plurality of first common pads;

a plurality of first transfer elements, configured respectively on the first common pads of the common pad groups, and electrically connected to the first common pads of the common pad groups and the common electrode;

n number of a plurality of second common pads, configured on the first substrate, configured to correspond respectively to the $1^{st}$ to $n^{th}$ second gate line groups, and located on the first side of the pixel structures; and n number of a plurality of second transfer elements, configured respectively on the n number of the second common pads, and electrically connected to the n number of the second common pads and the common electrode, wherein a common pad group of the common pad groups and a second common pad of the n number of the second common pads correspond to the same second gate line group, and a potential of the second common pad is greater than a plurality of potentials of the first common pads of the common pad group.

13. The display apparatus according to claim 12, further comprising:

a third common pad, configured on the first substrate, and located on the first side of the pixel structures, wherein the third common pad and the second common pads are arranged in sequence in the first direction and are structurally separated from each other, the third common pad is configured to correspond to the 1st second gate line group of the $1^{st}$ to $n^{th}$ second gate line groups, and a potential of the third common pad is greater than a plurality of potentials of the corresponding second common pads; and a third transfer element, configured on the third common pad, and electrically connected to the third common pad and the common electrode.

14. The display apparatus according to claim 10, further comprising:

a plurality of second common lines, configured on the first substrate, and the second gate lines and the second common lines are arranged in the first direction, wherein each of the second common lines is configured between two adjacent pixel columns of the pixel columns;

a first peripheral line, configured on the first substrate and located on a first side of the pixel structures, wherein the first common lines are electrically connected to the first peripheral line; and a second peripheral line, configured on the first substrate and located on a second side of the pixel structures, wherein two ends of each of the second common lines are electrically connected respectively to the first peripheral line and the second peripheral line.

15. The display apparatus according to claim 9, wherein the first gate lines include an odd number of the first gate lines and an even number of the first gate lines, the odd number of the first gate lines include $(1+2 \cdot K)^{th}$ first gate line, $K=0, 1, \ldots, p$, and p is a positive integer greater than or equal to 2, the even number of the first gate lines include $2L^{th}$ first gate line, $L=1, 2, \ldots, q$, and q is a positive integer greater than or equal to 3; the second gate lines include $1^{st}$ to $(p+1)^{th}$ second gate lines and $(p+2)$ to $(p+q+1)^{th}$ second gate lines arranged in sequence in the first direction; the $1^{st}$ to $(p+1)^{th}$ second gate lines are electrically connected to the $(1+2 \cdot K)^{th}$ first gate line, and the $(p+2)$ to $(p+q+1)^{th}$ second gate lines are electrically connected to the $2L^{th}$ first gate line.

16. The display apparatus according to claim 15, wherein a plurality of connection points of the $1^{st}$ to $(p+1)^{th}$ second gate lines and the $(1+2 \cdot K)^{th}$ first gate line as well as a plurality of connection points of the $(p+2)$ to $(p+q+1)^{th}$ second gate lines and the $2L^{th}$ first gate line are generally distributed along a plurality of diagonal lines parallel to each other.

17. The display apparatus according to claim 15, wherein a plurality of connection points of the $1^{st}$ to $(p+1)^{th}$ second gate lines and the $(1+2 \cdot K)^{th}$ first gate line as well as a plurality of connection points of the $(p+2)$ to $(p+q+1)^{th}$ second gate lines and the $2L^{th}$ first gate line are distributed generally in a V-shaped pattern.

* * * * *